United States Patent
Taylor et al.

(10) Patent No.: US 9,421,641 B2
(45) Date of Patent: Aug. 23, 2016

(54) SYSTEM AND METHOD FOR PROVIDING THERMAL MANAGEMENT OF AN OBSCURED LASER SYSTEM

(75) Inventors: Byron B. Taylor, Tucson, AZ (US);
Eric M. Palmer, Junction, UT (US);
David G. Jenkins, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 1273 days.

(21) Appl. No.: 13/339,219

(22) Filed: Dec. 28, 2011

(65) Prior Publication Data

US 2013/0170228 A1  Jul. 4, 2013

(51) Int. Cl.
| | |
|---|---|
| *G02B 5/08* | (2006.01) |
| *B23K 26/38* | (2014.01) |
| *G01S 7/481* | (2006.01) |
| *B23K 26/06* | (2014.01) |
| *F41H 13/00* | (2006.01) |
| *B23K 26/20* | (2014.01) |
| *B23K 26/36* | (2014.01) |
| *G02B 17/06* | (2006.01) |

(52) U.S. Cl.
CPC ............. *B23K 26/38* (2013.01); *B23K 26/066* (2015.10); *B23K 26/0648* (2013.01); *B23K 26/20* (2013.01); *B23K 26/36* (2013.01); *B23K 26/382* (2015.10); *B23K 26/704* (2015.10); *F41H 13/005* (2013.01); *G01S 7/481* (2013.01); *G02B 17/061* (2013.01)

(58) Field of Classification Search
CPC ........... G03F 7/70175; G03F 7/70141; G03F 7/70191; G02B 19/0019; G02B 5/001; G02B 5/003; G02B 27/09; G02B 26/10; G01N 21/47
USPC ................................ 359/850–853, 857, 858
See application file for complete search history.

(56) References Cited

U.S. PATENT DOCUMENTS

| | | | |
|---|---|---|---|
| 3,903,523 A | 9/1975 | Hartley, Jr. | |
| 3,972,599 A | 8/1976 | Engel et al. | |
| 4,296,388 A | 10/1981 | Draggoo | |
| 4,760,581 A | 7/1988 | Hoag | |
| 4,830,001 A | 5/1989 | Walus | |
| 5,995,265 A * | 11/1999 | Black | G02B 26/10 359/201.1 |
| 8,238,042 B2 | 8/2012 | DeWitt et al. | |
| 2009/0294417 A1 | 12/2009 | Spennemann et al. | |
| 2010/0282942 A1 | 11/2010 | Mosier et al. | |
| 2011/0309260 A1* | 12/2011 | Nishisaka | G03B 27/54 250/372 |

FOREIGN PATENT DOCUMENTS

GB  1 444 404  7/1976

OTHER PUBLICATIONS

Extented European Search Report dated Sep. 17, 2015 in connection with European Patent Application No. 12863914.3; 5 pages.
Notification of transmittal of the International Search Report and the Written Opinion of the International Searching Authority, or the Declaration dated Jan. 9, 2013 in connection with International Patent Application No. PCT/US2012/062382.

* cited by examiner

*Primary Examiner* — Euncha Cherry

(57) ABSTRACT

According to an embodiment of the disclosure, a system for providing thermal management of an obscured laser system is provided that includes a primary mirror, a secondary mirror, and a plurality of energy redirectors. The primary mirror is configured to reflect beam energy for the laser system. The secondary mirror is configured to function as a limiting aperture for the laser system and is aligned on-axis with respect to the primary mirror. The energy redirectors are each configured to redirect energy away from a corresponding obscuration and out of the laser system.

20 Claims, 7 Drawing Sheets

SYSTEM AND METHOD FOR PROVIDING THERMAL MANAGEMENT OF AN OBSCURED LASER SYSTEM

TECHNICAL FIELD

The present disclosure is directed, in general, to lasers and, more specifically, to a system and method for providing thermal management of an obscured laser system.

BACKGROUND OF THE DISCLOSURE

Compact, high-power laser systems typically rely on in-line systems, which have obscurations such as secondary mirrors, struts holding the system mirrors, and the like. The energy blocked by the obscurations may be scattered back into the system, causing substantial system heating. To address this issue, conventional obscured laser systems implement one or more existing solutions, including long cycle times and a beam dump. Off-axis laser systems may also be used to avoid the obscuration entirely.

Thus, some obscured laser systems provide long cycle times, thereby allowing the systems sufficient time to cool between shots. However, long cycle times have disadvantages that include a reduction in system effectiveness.

For systems including a beam dump, heat may be transferred out of the system using the beam dump. For example, some laser systems implement a cooling block that provides radiative or liquid cooling. However, such a cooling block requires cooling lines and pumps. In addition, using a cooling block reduces cycle time while waiting for the cooling block to cool and reduces the length of on time for the laser system. The complexity of a beam dump also reduces system reliability.

Off-axis systems attempt to avoid any obscurations that would require a beam dump by arranging the components off-axis from each other. However, off-axis systems typically require more space and are more difficult to align. In addition, the off-axis mirror sections are harder to manufacture and test.

SUMMARY OF THE DISCLOSURE

This disclosure provides a system and method for providing thermal management of an obscured laser system.

In one embodiment, a system for providing thermal management of an obscured laser system is provided that includes a primary mirror, a secondary mirror, and a plurality of energy redirectors. The primary mirror is configured to reflect beam energy for the laser system. The secondary mirror is configured to function as a limiting aperture for the laser system and is aligned substantially on-axis with respect to the primary mirror. The energy redirectors are each configured to redirect energy away from a corresponding obscuration and out of the laser system.

In another embodiment, a system for providing thermal management of an obscured laser system is provided that includes a primary mirror, a secondary mirror, and a central energy redirector. The primary mirror is configured to reflect beam energy for the laser system. The secondary mirror is configured to function as a limiting aperture for the laser system. The secondary mirror is aligned substantially on-axis with respect to the primary mirror and includes a central region. The central energy redirector is configured to redirect energy directed toward the central region. The primary mirror is configured to reflect the energy redirected away from the central region by the central energy redirector.

In yet another embodiment, a method for providing thermal management of an obscured laser system is provided that includes receiving laser energy at a primary/secondary set. The primary/secondary set includes a primary mirror and a secondary mirror that is aligned substantially on-axis with respect to the primary mirror. A first portion of the laser energy is directed into beam energy for the laser system. A second portion of the laser energy is directed away from a plurality of obscurations in the laser system and out of the laser system as excess energy.

Other technical features may be readily apparent to one skilled in the art from the following figures, descriptions, and claims.

BRIEF DESCRIPTION OF THE DRAWINGS

For a more complete understanding of the present disclosure, reference is now made to the following description taken in conjunction with the accompanying drawings, in which.

DETAILED DESCRIPTION

FIGS. 1 through 6, discussed below, and the various embodiments used to describe the principles of the present disclosure in this patent document are by way of illustration only and should not be construed in any way to limit the scope of the disclosure. Those skilled in the art will understand that the principles of the present disclosure may be implemented using any number of techniques, whether currently known or not. Additionally, the drawings are not necessarily drawn to scale.

Figure 1:
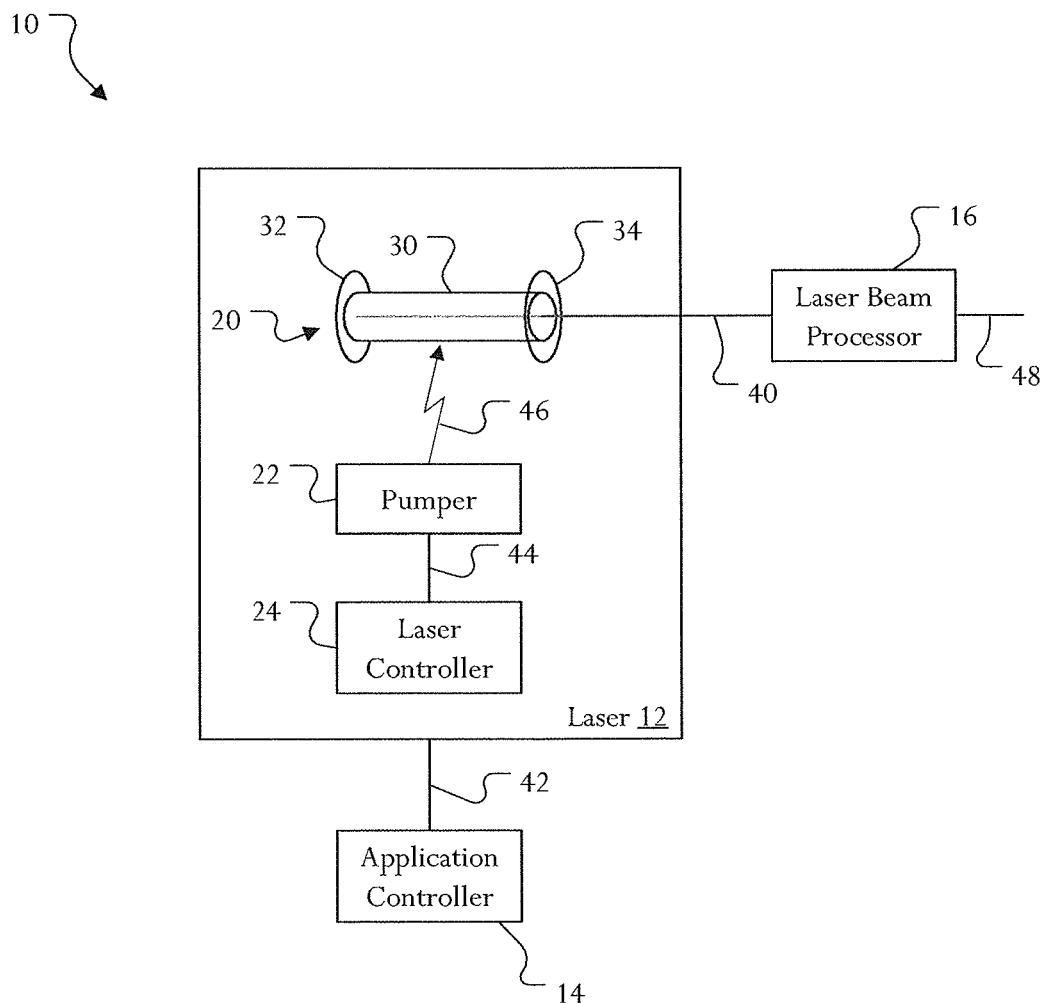
FIG. 1 illustrates an application including a laser in accordance with the present disclosure.

FIG. 1 illustrates an application 10 that includes a laser 12 in accordance with the present disclosure. The embodiment of the application 10 shown in FIG. 1 is for illustration only. Other embodiments of the application 10 could be used without departing from the scope of this disclosure.

In addition to the laser 12, the application 10 comprises an application controller 14 and a laser beam processor 16. The application 10 may be configured to perform any suitable operation that uses the laser 12 in its implementation. For example, the application 10 may be used for cutting, drilling, welding, engraving, cladding, aligning, micro-machining, heat-treating, imaging, ablating or any other suitable operation. The application 10 may be useful for industrial purposes, medical purposes, microelectronics manufacturing, graphics purposes, law enforcement purposes, entertainment purposes, scientific research, consumer electronics, defense or military purposes and/or for any other suitable purpose.

Depending on the application 10, the laser 12 may comprise a gas laser, a chemical laser, a solid-state laser, a fiber laser, a semiconductor laser or other suitable type of light source. Also depending on the application 10, the laser 12 may be configured to operate in a continuous wave mode and/or a pulsed mode, such as Q-switched, mode-locked, pulse-pumped and/or other suitable pulsed mode.

For the illustrated embodiment, the laser 12 comprises an optical cavity 20, a pumper 22, and a laser controller 24. The optical cavity 20 comprises a gain medium 30, a reflector 32 and an output coupler 34. The gain medium 30 comprises any suitable material that may be pumped by the pumper 22 in order to provide optical gain for the laser 12. The reflector 32 may comprise a high-reflectivity mirror that is configured to reflect substantially all the light from the gain medium 30 back through the optical cavity 20. The output coupler 34 may comprise a partially reflective mirror. The output coupler 34 is configured to reflect a portion of the light from the gain medium 30 back through the optical cavity 20 and to transmit another portion of the light from the gain medium 30 as an output laser beam 40.

The laser controller 24 is configured to control the pumper 22. For example, based on a control signal 42 from the application controller 14, the laser controller 24 may be configured to turn the pumper 22 on and off by generating a pumper signal 44. The pumper 22 is configured to generate energy 46 based on the pumper signal 44 and to direct that energy 46 toward the gain medium 30 of the optical cavity 20.

The application controller 14 is configured to provide control of the laser 12 for the application 10. For example, the application controller 14 may be configured to generate the control signal 42 in order to activate the laser 12 such that the application 10 may use the laser 12 to perform a specified task. In addition, the application controller 14 may be configured to deactivate the laser 12 when the task is completed. The application controller 14 may also be configured to provide control of other components of the application 10, such as the laser beam processor 16 and/or other suitable components (not shown in FIG. 1).

The laser beam processor 16 is configured to process the laser beam 40 in accordance with the application 10 in order to generate a processed laser beam 48. For example, the laser beam processor 16 may be configured to route the laser beam 40 based on the application 10. As a specific example, the laser beam processor 16 may be configured to direct the processed laser beam 48 toward a predetermined target, such as a mortar, a machine, electronics, a vehicle, a body part, or any other suitable target.

Although FIG. 1 illustrates one example of an application 10 including a laser 12, various changes may be made to FIG. 1. For example, the makeup and arrangement of the application 10 are for illustration only. Components could be added, omitted, combined, subdivided, or placed in any other suitable configuration according to particular needs. In addition, FIG. 1 illustrates one environment in which the laser 12 may be implemented. However, the laser 12 may be used in any other suitable system without departing from the scope of this disclosure.

Figure 2:
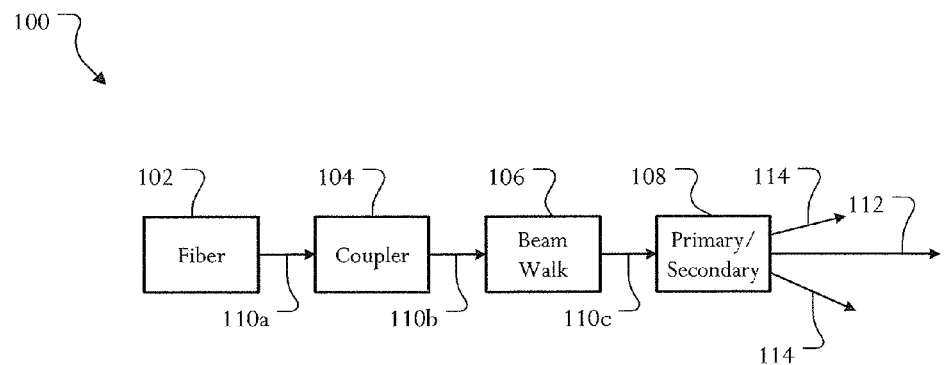
FIG. 2 illustrates a block diagram of an obscured laser system in which thermal management may be implemented in accordance with the present disclosure.

FIG. 2 illustrates a block diagram of an obscured laser system 100 in which thermal management may be implemented in accordance with the present disclosure. The embodiment of the laser system 100 shown in FIG. 2 is for illustration only. Other embodiments of the laser system 100 could be used without departing from the scope of this disclosure.

The illustrated laser system 100 comprises a fiber 102, a coupler set 104, a beam walk set 106 and a primary/secondary set 108. The fiber 102 may comprise a 50 kW fiber laser or any other suitable type of laser. The fiber 102 is configured to generate laser energy 110 for the laser system 100. The coupler set 104 comprises any suitable arrangement of mirrors and/or lenses for directing the laser energy 110 generated by the fiber 102 to the beam walk set 106. For some embodiments, the coupler set 104 comprises an all-reflective coupler that is configured to handle a heat load higher than that of a refractive system. In addition, the coupler set 104 is configured to match the laser energy 110 out of the fiber 102 to the primary/secondary set 108. The beam walk set 106 comprises any suitable arrangement of mirrors and/or lenses for directing the laser energy 110 received from the coupler set 104 to the primary/secondary set 108. In addition, the beam walk set 106 is configured to provide fine beam steering of the laser energy 110 towards a target while keeping the laser energy 110 substantially centered physically with respect to the primary/secondary set 108. The primary/secondary set 108 may comprise a plurality of mirrors that are configured to concentrate the laser energy 110 from the beam walk set 106 onto the target. As illustrated in FIG. 2, the laser energy 110 may be referred to as laser energy 110a when generated by the fiber 102, as laser energy 110b when directed by the coupler set 104 to the beam walk set 106, and as laser energy 110c when directed from the beam walk set 106 to the primary/secondary set 108.

As described in more detail below, the primary/secondary set 108 may comprise primary and secondary structures configured to direct the laser energy 110c received from the beam walk set 106 into an energy beam 112, which is the output of the laser system 100. The primary/secondary set 108 comprises an in-line set such that the laser system 100 comprises an obscured system. While the obscurations in a conventional obscured laser system would scatter a significant amount of energy back into the system, the obscurations in the laser system 100 do not scatter a large amount of energy back into the laser system 100. Instead, most of the energy that would otherwise be scattered back into the system 100 is directed out of the system 100 as excess energy 114. Therefore, a relatively large portion of the laser energy 110c is directed either into the energy beam 112 or out of the laser system 100 as excess energy 114. As a result, the excess energy 114 does not become trapped and heat up the components of the system 100. Thus, the system 100 does not require the use of a beam dump to provide cooling.

For some embodiments, the fiber 102 may correspond to the laser 12, the coupler set 104, the beam walk set 106 and the primary/secondary set 108 may correspond to the laser beam processor 16, the laser energy 110a may correspond to the laser beam 40, and the energy beam 112 and the excess energy 114 may correspond to the processed laser beam 48.

Figure 3A:
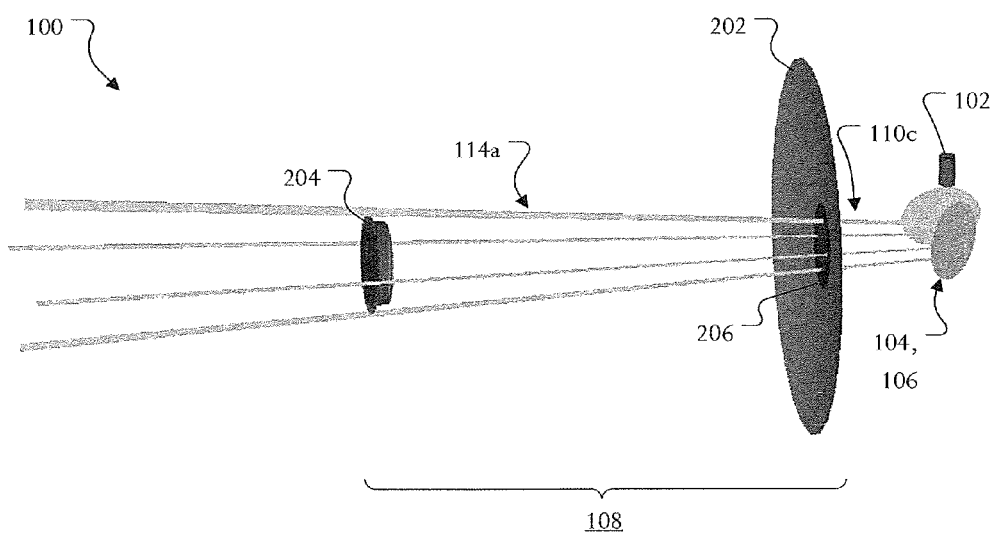
FIGS. 3A-C illustrate thermal management of the obscured laser system of FIG. 2 in accordance with various aspects of the present disclosure.
Figure 3B:
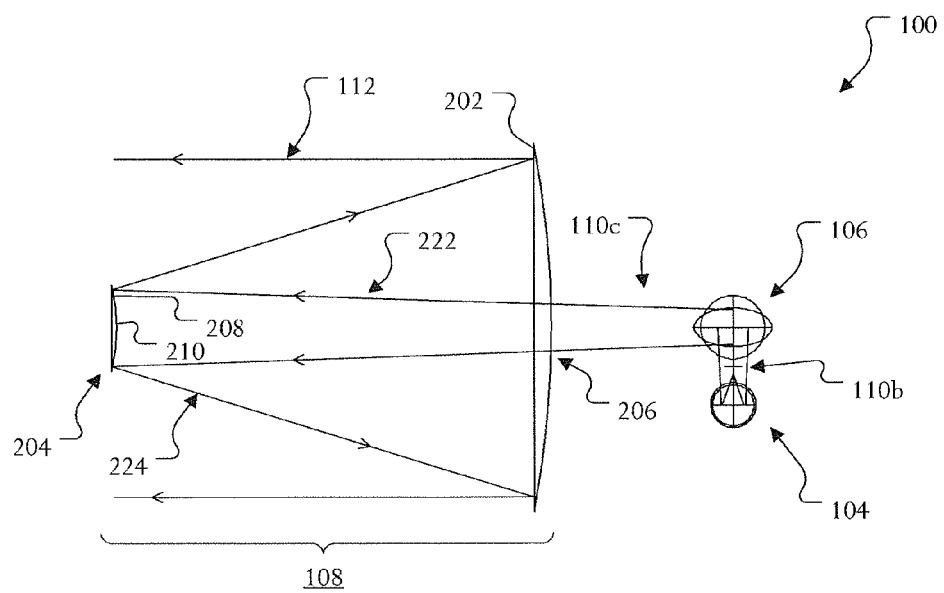
Figure 3C:
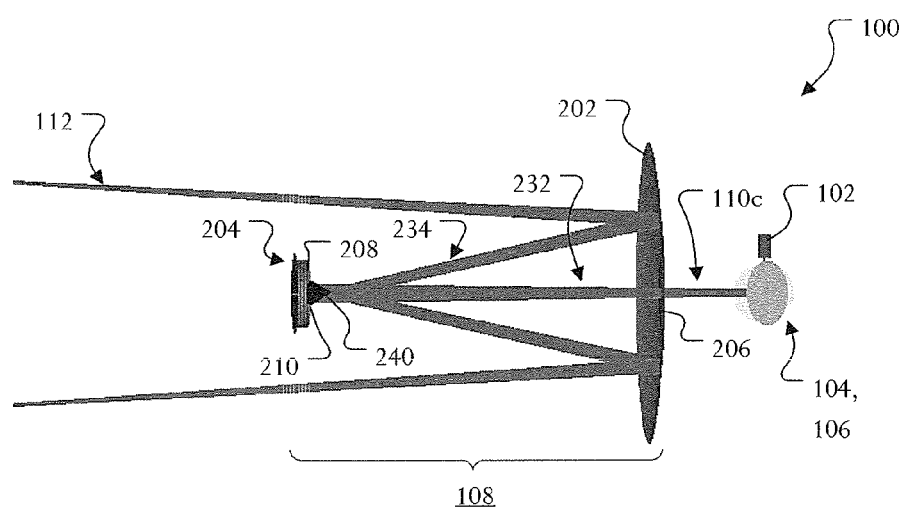

FIGS. 3A-C illustrate thermal management of the obscured laser system 100 in accordance with various aspects of the present disclosure. The embodiments of the laser system 100 shown in FIGS. 3A-C are for illustration only. Other embodiments of the laser system 100 could be used without departing from the scope of this disclosure.

As shown in FIGS. 3A-C, the primary/secondary set 108 comprises a primary mirror 202 and a secondary mirror 204 that are aligned substantially on-axis with respect to each other. The primary mirror 202 comprises an aperture 206 that allows the laser energy 110c directed by the beam walk set 106 to pass through the primary mirror 202. For some embodiments, the primary mirror 202 comprises a large diamond-turned aluminum mirror.

As shown in FIG. 3A, the secondary mirror 204 comprises a stop for the laser system 100, i.e., the secondary mirror 204 is a limiting aperture for the laser system 100. Thus, a first portion of excess energy 114a included in the laser energy 110c is allowed to pass by the edges of the secondary mirror 204 and out of the system 100. As a result, this excess energy 114a is not scattered back into the system 100 and absorbed.

As shown in FIGS. 3B-C, the secondary mirror 204 comprises a peripheral region 208 and a central region 210. At least a portion of the laser energy 110c coming through the aperture 206 comprises peripheral energy 222, which is energy that strikes the peripheral region 208. The peripheral energy 222 is reflected off the peripheral region 208 of the secondary mirror 204 as reflected peripheral energy 224, which strikes the primary mirror 202 and is reflected off the primary mirror 202 as beam energy 112.

At least another portion of the laser energy 110c coming through the aperture 206 comprises central energy 232, which is energy that is directed toward the central region 210 of the secondary mirror 204. If the central energy 232 struck the central region 210 of the secondary mirror 204, reflected central energy 234 would be directed back through the aperture 206 and into the system 100. Thus, the primary/secondary set 108 may comprise an energy redirector in the form of a central energy redirector 240 that is configured to redirect the reflected central energy 234 to the primary mirror 202 instead of to the aperture 206. The primary mirror 202 may then reflect the reflected central energy 234 as beam energy 112. In the embodiment illustrated in FIG. 3C, the central energy redirector 240 comprises an axicon. However, it will be understood that any other suitable device may be implemented to redirect the reflected central energy 234 such that at least a significant portion of the reflected central energy 234 is directed toward the primary mirror 202.

The central energy redirector 240 is coupled to, or located in close proximity to, the central region 210 of the secondary mirror 204. For some embodiments, the central energy redirector 240 may block substantially all of the central region 210 of the secondary mirror 204 and may not block substantially all of the peripheral region 208 of the secondary mirror 204. However, it will be understood that the central energy redirector 240 may be configured so as not to block an insignificant portion of the central region 210 and/or to block an insignificant portion of the peripheral region 208 without departing from the scope of this disclosure.

Figure 4A:
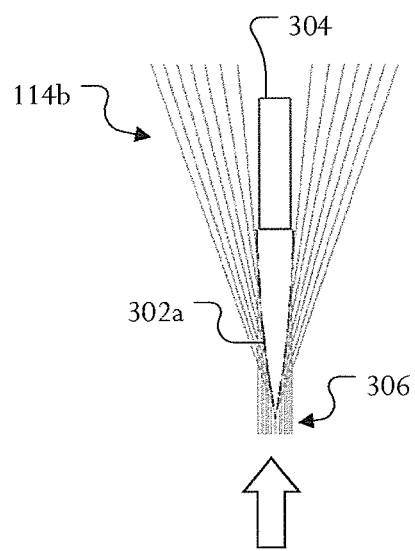
FIGS. 4A-B illustrate thermal management of the obscured laser system of FIG. 2 through the use of V-guards in accordance with the present disclosure.
Figure 4B:
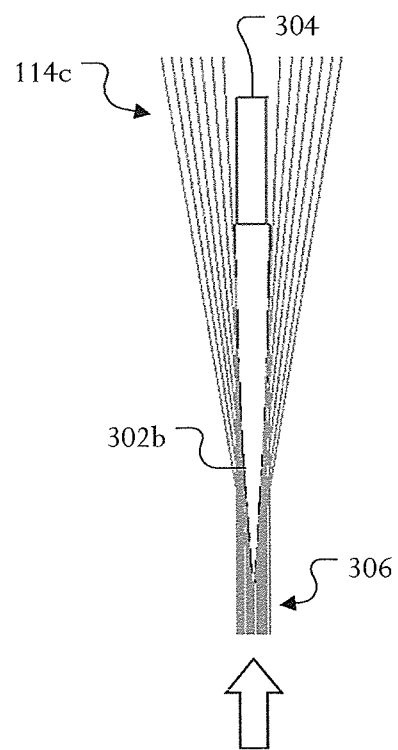

FIGS. 4A-B illustrate thermal management of the obscured laser system 100 through the use of V-guards 302 in accordance with the present disclosure. The V-guards 302 are energy redirectors that are configured to redirect energy away from obscurations. The embodiments of the V-guards 302 shown in FIGS. 4A-B are for illustration only. Other embodiments of the V-guards 302 could be used without departing from the scope of this disclosure.

As shown in FIGS. 4A-B, a strut 304 that may be configured to couple the secondary mirror 204 to a housing for the laser system 100 (not shown in FIGS. 4A-B) may be in a path of energy 306 reflected off the primary mirror 202 that would be included as beam energy 112 if not for the strut 304 blocking the energy 306 from exiting the laser system 100. If the energy 306 struck the strut 304, the energy 306 would heat up the strut 304. This could result in the strut 304 becoming twisted or bent, thereby interfering with the projection of the beam energy 112 from the laser system 100. Also, the energy 306 would scatter off the strut 304 in an uncontrolled manner.

Thus, as shown in FIGS. 4A-B, a V-guard 302 may be coupled to, or located in close proximity to, the strut 304. The V-guard 302 is configured to direct the energy 306 away from the strut 304 and out of the system 100 as excess energy 114 in a controlled manner. The length-to-width ratio of the V-guard 302 may be selected in order to result in the excess energy 114 exiting the system 100 at a specified angle. For example, as shown in FIG. 4A, when the V-guard 302a has a shorter length relative to its width, the excess energy 114b may exit the system 100 at a higher angle, such as 20°. Similarly, as shown in FIG. 4B, when the V-guard 302b has a longer length relative to its width, the excess energy 114c may exit the system 100 at a smaller angle, such as 4°. Thus, for example, an appropriate length-to-width ratio for the V-guard 302 may be selected such that the angle of the excess energy 114 is limited in a manner that ensures that the excess energy 114 directed out of the system 100 by the V-guard 302 will not result in an eye hazard.

Figure 5A:
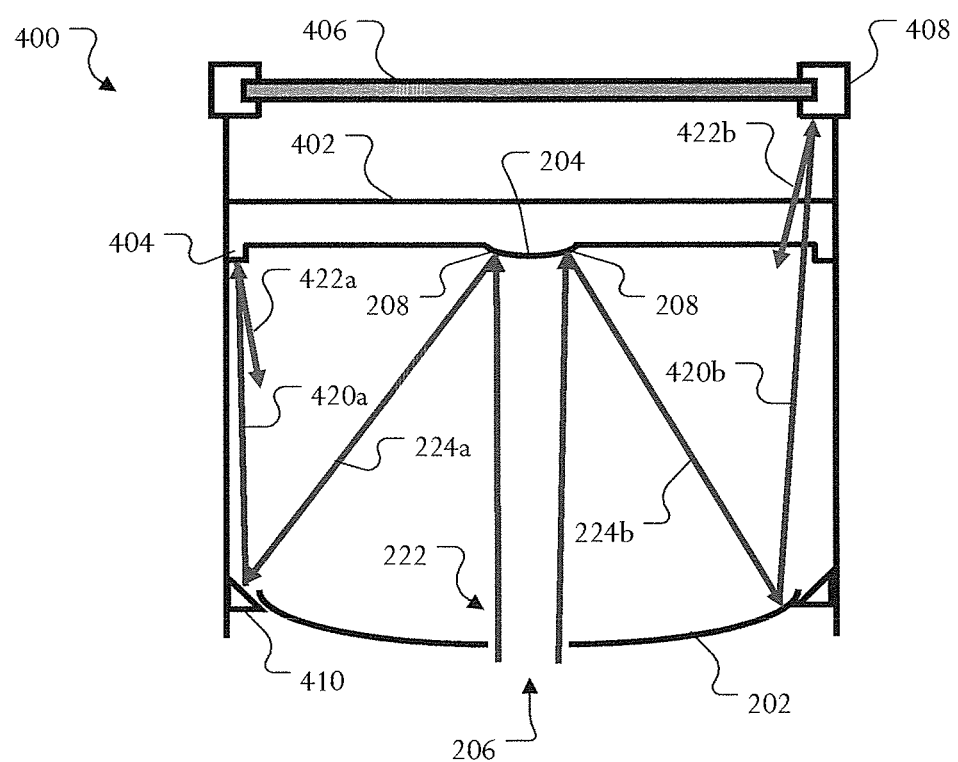
FIGS. 5A-B illustrate thermal management of the obscured laser system of FIG. 2 through the use of tapers in accordance with the present disclosure.
Figure 5B:
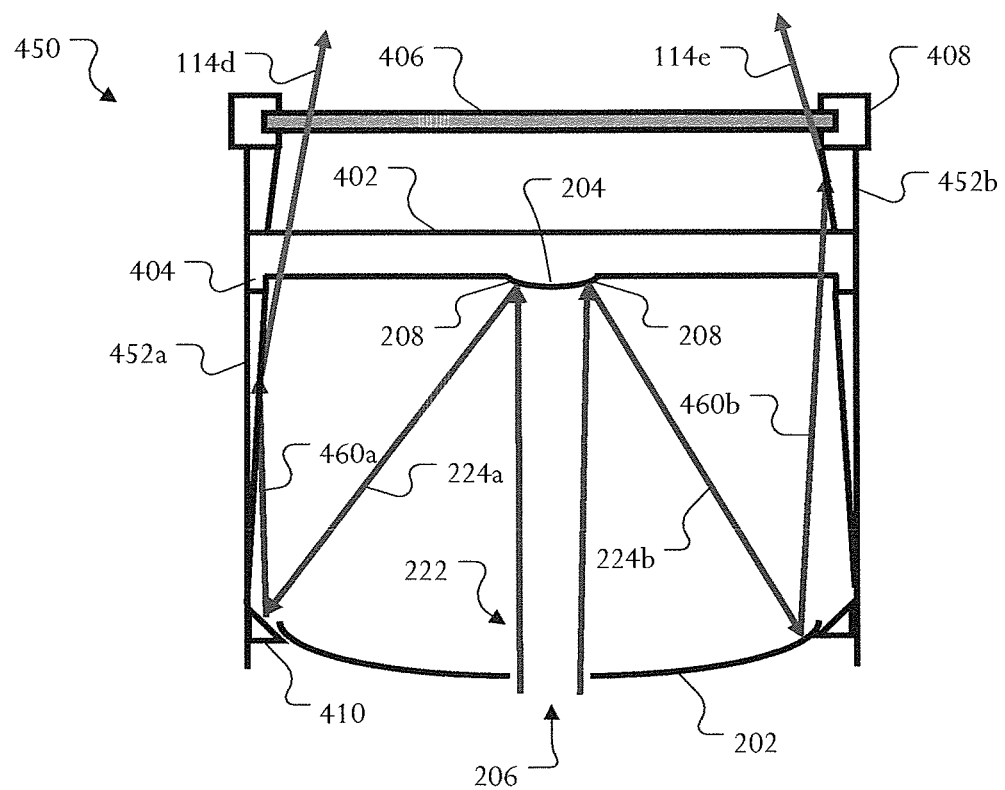

FIGS. 5A-B illustrate thermal management of the obscured laser system 100 through the use of tapers 452 in accordance with the present disclosure. FIG. 5A illustrates a housing 400 in which no tapers are implemented and FIG. 5B illustrates a housing 450 in which tapers 452 are implemented in order to show the difference in thermal management when tapers 452 are added to the housing 450. The embodiments of the housing 400 and 450 shown in FIGS. 5A-B are for illustration only. Other embodiments of the housing 400 or 450 could be used without departing from the scope of this disclosure.

As shown in FIGS. 5A-B, a portion of the housing 400 or 450 for the laser system 100 may be implemented that includes a mount 402 for the secondary mirror 204, which includes struts 404 that couple the mount 402 to the housing 400 or 450, an output window 406, a mounting ring 408 for the output window 406, and primary edge guards 410 for the primary mirror 202.

As described above, FIG. 5A illustrates the housing 400 for the laser system 100 in which no tapers are implemented. For this example, peripheral energy 222 comes through the aperture 206, strikes the peripheral region 208 of the secondary mirror 204, and is reflected off the secondary mirror 204 as reflected peripheral energy 224a and 224b. In the illustrated example, the reflected peripheral energy 224a is reflected off one of the primary edge guards 410 as obscured energy 420a. The strut 404 scatters the obscured energy 420a back into the system 100 as trapped energy 422a. Similarly, the reflected peripheral energy 224b is reflected off the primary mirror 202 as obscured energy 420b. The mounting ring 408 scatters the obscured energy 420b back into the system 100 as trapped energy 422b.

Therefore, any one of a number of obscurations, such as the struts 404, mounting rings 408 or the like, may reflect obscured energy 420 back into the system 100 as trapped energy 422. This trapped energy 422, which is energy that does not exit the system 100 as intended, may heat up components of the laser system 100, reducing both system effectiveness and on time for the laser system 100.

As described above, FIG. 5B illustrates the housing 450 for the laser system 100 in which tapers 452 are implemented. The tapers 452 are energy redirectors that are configured to redirect energy away from obscurations. For the illustrated embodiment, tapers 452 are coupled to the struts 404 and the mounting ring 408. However, it will be understood that tapers 452 may be coupled to, or located in close proximity to, any suitable obscuration of the system 100 that is capable of causing back reflections. The embodiments of the tapers 452 shown in FIG. 5B are for illustration only. Other embodiments of the tapers 452 could be used without departing from the scope of this disclosure.

For this embodiment, peripheral energy 222 comes through the aperture 206, strikes the peripheral region 208 of the secondary mirror 204, and is reflected off the secondary mirror 204 as reflected peripheral energy 224a and 224b. In the illustrated example, the reflected peripheral energy 224a is reflected off one of the primary edge guards 410 as unobscured energy 460a. Instead of being reflected back into the system 100 by the stmt 404, the unobscured energy 460a is reflected off the taper 452a and out of the system 100 as excess energy 114d. Similarly, the reflected peripheral energy 224b is reflected off the primary mirror 202 as unobscured energy 460b. Instead of being reflected back into the system 100 by the mounting ring 408, the unobscured energy 460b is reflected off the taper 452b and out of the system 100 as excess energy 114e.

Thus, as described above, a taper 452 may be provided for any suitable obscuration, such as the struts 404, mounting ring 408 or the like, in order to reflect unobscured energy 460 out of the system 100 as excess energy 114 instead of allowing obscured energy 420 to become trapped energy 422. In this way, excess energy 114 is removed from the system and, thus, is unavailable to heat up components of the laser system 100. As a result, the housing 450 provides increased system effectiveness and greater on time for the laser system 100 as compared to the housing 400.

Figure 6:
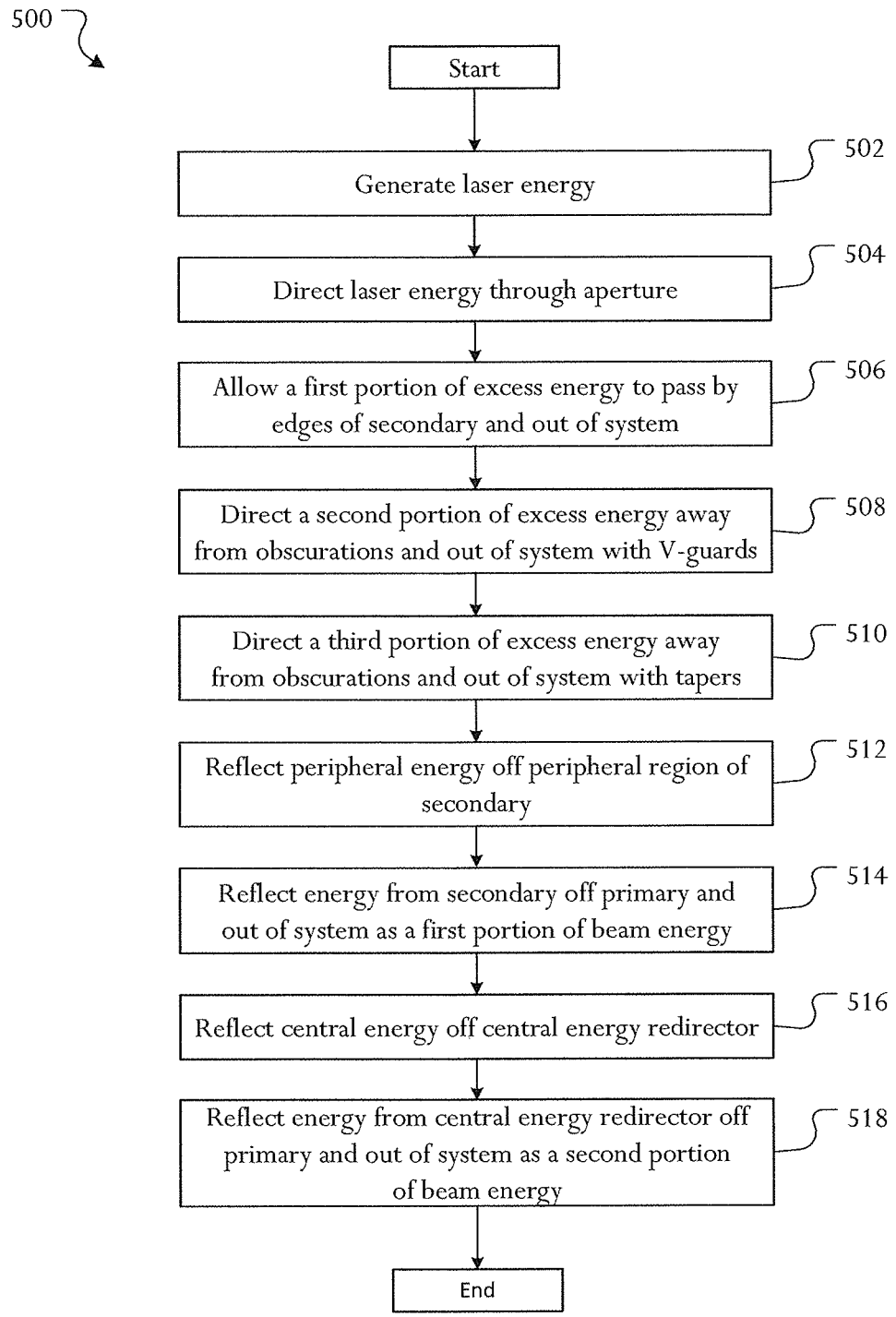
FIG. 6 is a flowchart illustrating a method for providing thermal management of the obscured laser system of FIG. 2 in accordance with the present disclosure.

FIG. 6 is a flowchart illustrating a method 500 for providing thermal management of the obscured laser system 100 in accordance with the present disclosure. The method 500 shown in FIG. 6 is for illustration only. Thermal management may be provided for the laser system 100 in any other suitable manner without departing from the scope of this disclosure.

Initially, the laser system 100 generates laser energy 110 (step 502). For example, the fiber 102 may generate laser energy 110a. The laser energy 110 is directed through the aperture 206 of the primary mirror 202 (step 504). For example, the coupler 104 may receive the laser energy 110a generated by the fiber 102 and direct laser energy 110b to the beam walk set 106, and the beam walk set 106 may receive the laser energy 110b and direct laser energy 110c to the primary/secondary set 108. Specifically, the beam walk set 106 may direct the laser energy 110c through the aperture 206 of the primary mirror 202.

A first portion of excess energy 114a is allowed to pass by the edges of the secondary mirror 204 and out of the system 100 (step 506). Thus, the secondary mirror 204 functions as a limiting aperture, or stop, for the system 100. A second portion of excess energy 114b or 114c is directed away from obscurations and out of the system 100 by at least one V-guard 302 (step 508). For example, a V-guard 302 may be provided for each stmt 304 in order to redirect energy 306 out of the system 100. A third portion of excess energy 114d and/or 114e is directed away from obscurations and out of the system 100 by at least one taper 452 (step 510). For example, a taper 452 may be provided for each stmt 404 and/or mounting ring 408 in order to redirect unobscured energy 460 out of the system 100.

Peripheral energy 222 is reflected off the peripheral region 208 of the secondary mirror 204 (step 512), and the reflected peripheral energy 224 from the secondary mirror 204 is reflected off the primary mirror 202 and out of the system 100 as a first portion of beam energy 112 (step 514). Central energy 232 is reflected off the central energy redirector 240 (step 516), and the reflected central energy 234 from the central energy redirector 240 is reflected off the primary mirror 202 and out of the system 100 as a second portion of beam energy 112 (step 518). For example, the central energy 232 may be reflected off a central energy redirector 240 that comprises an axicon coupled to the central region 210 of the secondary mirror 204.

In this way, energy that would otherwise be obscured and scattered back into the obscured laser system 100 is released from the system 100 as excess energy 114 or included as beam energy 112 for the system 100. For example, excess energy 114a is passed out of the system 100 because the secondary mirror 204 is used as the limiting aperture for the system 100. In addition, central energy 232 that would otherwise be incident on the central region 210 of the secondary mirror 204 is redirected by the central energy redirector 240 and added to the beam energy 112. Energy 306 that would be incident on struts 304 is directed out of the system 100 as excess energy 114b and/or 114c by V-guards 302, and unobscured energy 460 that would otherwise be obscured energy 420 is directed out of the system 100 as excess energy 114d and/or 114e by tapers 452.

Although FIG. 6 illustrates one example of a method 500 for providing thermal management of the obscured laser system 100, various changes may be made to FIG. 6. For example, while shown as a series of steps, various steps in FIG. 6 could overlap, occur in parallel, occur in a different order, or occur multiple times. In addition, some steps could be omitted for systems 100 that omit one or more of the secondary mirror 204 as a stop, the central energy redirector 240, V-guards 302 and tapers 452.

Modifications, additions, or omissions may be made to the systems, apparatuses, and methods described herein without departing from the scope of the disclosure. For example, the components of the systems and apparatuses may be integrated or separated. Moreover, the operations of the systems and apparatuses may be performed by more, fewer, or other components. The methods may include more, fewer, or other steps. Additionally, as described above, steps may be performed in any suitable order.

It may be advantageous to set forth definitions of certain words and phrases used throughout this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The term "each" refers to each member of a set or each member of a subset of a set. Terms such as "over" and "under" may refer to relative positions in the figures and do not denote required orientations during manufacturing or use. Terms such as "higher" and "lower" denote relative values and are not meant to imply specific values or ranges of values. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A system for providing thermal management of an obscured laser system comprising:
    a primary mirror configured to reflect beam energy for the laser system;
    a secondary mirror configured to function as a limiting aperture for the laser system, wherein the secondary mirror is aligned substantially on-axis with respect to the primary mirror; and
    a plurality of energy redirectors, wherein each of the energy redirectors is configured to redirect energy away from a corresponding obscuration and out of the laser system.

2. The system of claim 1, wherein the secondary mirror comprises a central region, wherein the energy redirectors comprise a central energy redirector, wherein the corresponding obscuration for the central energy redirector comprises the central region, and wherein the primary mirror is configured to reflect the energy redirected away from the central region by the central energy redirector.

3. The system of claim 2, wherein the central energy redirector comprises an axicon.

4. The system of claim 1, wherein the energy redirectors comprise at least one V-guard, and wherein the corresponding obscuration for the at least one V-guard comprises a strut.

5. The system of claim 4, wherein a length-to-width ratio is selected for the V-guard such that the energy redirected away from the strut is redirected at a specified angle.

6. The system of claim 1, wherein the energy redirectors comprise at least one taper.

7. The system of claim 6, wherein the corresponding obscuration for the at least one taper comprises a strut, further comprising:
    a housing configured to house at least a portion of the laser system; and
    a secondary mount configured to couple the secondary mirror to the housing, wherein the secondary mount comprises the strut.

8. A system for providing thermal management of an obscured laser system comprising:
    a primary mirror configured to reflect beam energy for the laser system;
    a secondary mirror configured to function as a limiting aperture for the laser system, wherein the secondary mirror is aligned substantially on-axis with respect to the primary mirror and the secondary mirror comprises a central region; and
    a central energy redirector configured to redirect energy directed toward the central region away from an aperture of the primary mirror, wherein the primary mirror is configured to reflect the energy redirected away from the central region by the central energy redirector.

9. The system of claim 8, wherein the central energy redirector comprises an axicon.

10. The system of claim 8, further comprising:
    a strut; and
    a V-guard coupled to the strut, wherein the V-guard is configured to redirect energy directed toward the strut away from the strut.

11. The system of claim 10, wherein the V-guard comprises a length-to-width ratio that is selected such that the energy redirected away from the strut is redirected at a specified angle.

12. The system of claim 8, further comprising a taper configured to redirect energy directed towards a corresponding obscuration away from the corresponding obscuration.

13. The system of claim 12, wherein the corresponding obscuration for the taper comprises a strut, further comprising:
    a housing configured to house at least a portion of the laser system; and
    a secondary mount configured to couple the secondary mirror to the housing, wherein the secondary mount comprises the strut.

14. A method for providing thermal management of an obscured laser system comprising:
    receiving laser energy at a primary/secondary set, wherein the primary/secondary set comprises a primary mirror and a secondary mirror aligned substantially on-axis with respect to the primary mirror;
    directing a first portion of the laser energy into beam energy for the laser system; and
    directing a second portion of the laser energy away from a plurality of obscurations in the laser system and out of the laser system as excess energy.

15. The method of claim 14, wherein directing the second portion of the laser energy comprises preventing the excess energy from being scattered back into the laser system by the obscurations.

16. The method of claim 14, wherein directing the second portion of the laser energy comprises providing the secondary mirror as a limiting aperture for the laser system such that a first portion of the excess energy is allowed to pass by the secondary mirror and out of the laser system.

17. The method of claim 16, wherein directing the second portion of the laser energy further comprises directing a second portion of the excess energy away from struts with corresponding V-guards.

18. The method of claim 16, wherein directing the second portion of the laser energy further comprises directing a second portion of the excess energy away from struts with corresponding tapers.

19. The method of claim 14, wherein the secondary mirror comprises a central region, and wherein directing the first portion of the laser energy comprises redirecting laser energy directed toward the central region with a central energy redirector.

20. The method of claim 14, wherein the central energy redirector comprises an axicon.

* * * * *